United States Patent [19]

Hartkorn

[11] 4,209,389

[45] Jun. 24, 1980

[54] MICROBIOLOGICAL METHOD FOR REMOVING PATHOGENIC MICROBES AND DISSOLVED ORGANIC MATERIALS FROM LIQUIDS

[76] Inventor: Karl H. Hartkorn, Heinri-Zille-Strasse 37, 6085 Nauheim, Fed. Rep. of Germany

[21] Appl. No.: 896,605

[22] Filed: Apr. 14, 1978

Related U.S. Application Data

[63] Continuation of Ser. No. 597,977, Jul. 22, 1975, abandoned.

[30] Foreign Application Priority Data

Jul. 29, 1974 [DE] Fed. Rep. of Germany ....... 2436535

[51] Int. Cl.$^2$ .............................................. C02C 1/04
[52] U.S. Cl. ........................................ 210/11; 210/18
[58] Field of Search ............... 210/2, 11, 17, 18, 42 R; 204/152

[56] References Cited

U.S. PATENT DOCUMENTS

| | | | |
|---|---|---|---|
| 3,112,261 | 11/1963 | Portel et al. | 210/11 |
| 3,580,840 | 5/1971 | Uridil | 210/11 |
| 3,751,338 | 8/1973 | Farris | 210/11 |
| 3,767,046 | 10/1973 | Hartkorn | 204/152 X |
| 3,801,499 | 4/1974 | Luck | 210/11 |

OTHER PUBLICATIONS

Webb, "Byproducts from Milk", 2nd Edition, Avi Pub. Co., Conn. 1970, pp. 34–35.

*Primary Examiner*—Thomas G. Wyse
*Attorney, Agent, or Firm*—Ernest F. Marmorek

[57] ABSTRACT

The specification describes a method for removing pathogenic germs and dissolved organic substances from liquids. Kefir milk acid bacteria in the form of a centrifugate, obtained from washing-out Kefir mold cultures are added to the liquid after suitable electrochemical precleaning. The liquid mixed with the bacteria is passed over a cylindrical column, whose filling bodies consist of cylindrically shaped fabric of antimagnetic stainless steel with a large surface. On this the microorganisms of the Kefir group become deposited, from a biological lawn and in the case of the supply of atmospheric oxygen and multiple passage of the liquid through the column the organic liquid contaminating materials finally take up the pathogenic germs as nutrient material so that owing to the microbiological processes of the Kefir bacteria the liquids are freed from these materials.

6 Claims, No Drawings

MICROBIOLOGICAL METHOD FOR REMOVING PATHOGENIC MICROBES AND DISSOLVED ORGANIC MATERIALS FROM LIQUIDS

This is a continuation of application Ser. No. 597,977, filed July 22, 1975, now abandoned.

In the removal of organic materials from liquids use is made most frequently of biochemical methods whose efficacy depends upon the presence of organisms, present in the water in nature, such as Rotifera, *Vorticella sp.*, Parameceae, *Flagellum sp., Forticalle camparum, Protozoon sp.* and upon the presence of oxygen.

Generally, contaminating materials from the macro to the micro range, that is to say from 200 to 10 microns, are removed by sedimentation from the liquid before it is brought into contact with an equivalent quantity of the above-mentioned microorganisms and minute forms of life either in a dropping method or in an activated sludge method with the simultaneous supply of atmospheric oxygen.

Colloidal contaminating materials, colloidal suspensions and materials in the same order of size as ions are first enzymatically converted in such biochemical stages and then partly oxidized by metabolism of the organisms and are partly adsorbed by becoming attached to the organisms.

A necessary condition for obtaining a high efficiency is the presence of conditions which are favourable for the organisms, that is to say the right temperature, a pH-value near neutral, the absence of poisons, such as bactericides, insecticides, heavy metals starting at a certain concentration and the presence of phosphates and nitrogen compounds.

Activated sludge installations with optimum degrees of efficiency are generally operated with a proportion of activated sludge of 4 gram per liter.

The time the material remains in the reaction spaces depends upon the composition of the contaminating materials in the liquid and amounts to between 1 hour to, in some cases, 48 hours in the case of particularly resistant sewage.

In the case of purely domestic sewage the dissolved organic substances consist of carbohydrates, proteins and sugars. They make a rapid chemical degradation possible. However, in the case of such cleaning processes after half an hour, on average 250 ml of sludge can be deposited, as measured in an Imhoff funnel, per liter of sewage sludge mixture and such sludge can only be dewatered with difficulty, even if owing to danger to hygiene, the sludge is placed in so-called decomposing towers before dewatering.

Highly concentrated sewage, as for example from slaughterhouses, dairies, jam factories and premises for disposing of animal bodies, can in accordance with experience to date only be sufficiently purified in so-called prolonged activation installations, in the case of which the chargingg rate per unit volume must partly be reduced to 0.3 kg $BSB_5$ or BOD per square meter of activated space per day.

In the case of sewage from paper and pulp industries similar difficulties occur; in this respect more especially glucosides, lignins, tannins and xylose resulting from the break-down of wood make biochemical degradation more difficult. Very often in the case of such sewage $BSB_5$ or BOD discharges values are obtained after the biochemical cleaning which are very satisfactory; however the values for potassium permanganate consumption and chemical oxygen requirement, in accordance with the dichromate method are often unacceptably higher than is the case with the measured biochemical oxygen requirement. The differences show in many cases in that with the biochemical processes only partial degradation occurs and in the case of the BOD measurement the actual residual load is not covered.

The cause for the differences in the last-mentioned example are to be found substantially in the insufficient enzymatic break-down of the contaminating materials in the liquid before the actual biochemical oxidation and adsorption.

Agricultural sewage involves difficulties similar to those occuring with known biochemical degradation processes. In the case of sewage from mass pig farming it is known that approximately 30% of the protein materials fed, leave the animals without digestion and it is only after complicated splitting processes that they are in a condition fit for oxidation by organisms in biological installations.

In normal domestic sewage, numerous pathogenic microbes are present which cannot be biochemically degraded and, if at all, can only be removed by adsorption on biological sludge from the sewage. It may be assumed with certainty that in every sample of normal domestic sewage at least 1,000,000 microbes are present per ml which for the most part are *Escherichia coli*, though the proportion of facultatively pathogenic microbes is very high, so that sewage is to be considered highly infectious.

Efficient biochemical cleaning installations remove 98% of the microbes by adsorption. On the basis of the above-mentioned example, as a result, the discharge from a well operated biological cleaning installation, 10,000 microbes in all still remain per ml. In the case of public waters which are permitted for human bathing and for drinking by animals, not more than 10 microbes per ml should be present.

Owing to the increasing quantities even of purified sewage in comparison with the quantity of water on the surface of the Earth, which always remains the same, the danger of infection by sewage is therefore increasing steadily.

The method in accordance with the invention avoids the above-mentioned disadvantages by the use as a preliminary stage of an electrochemical process, the electro-M-method, by means of which all colloidal materials and substantially all colloidal suspensions are removed from liquids. The electro-M-method is assumed to be known.

The liquids comprise after the process substantially only parts of colloidal suspensions and the dissolved organic substances in addition to inorganic contaminating substances.

Since the electrochemical process brings about a substantial removal of all microbes from the liquids, the discharged liquid is inocculated with lactic acid bacteria of the Caucasian Kefir group.

In this respect it is a question of microbic organisms, which even in acidic condition and up to pH-values of 10 reproduce themselves by cell division very rapidly in the presence of atmospheric oxygen and after suitable conditioning to conditions oxidize, more especially sugar, glucose, proteins and fats.

It has been found in tests, that owing to the capability of Kefir organisms to degrade proteins, a certain cannibalism results which has a favorable effect on the pathogenic microbes which also exist as is known on a protein basis in the liquids.

The consequence of the procedure in which firstly by means of electrochemical processes or chemical processes, which are also possible, but owing to the large amounts of sludge involved and of other consequences which are disadvantageous for protecting water, such as salting out, increasing the sulfate load etc., the sewage or other liquids is substantially freed of all contaminating materials with the exception of colloidal suspensions and dissolved materials and is then exposed to the action of Kefir microorganisms, is that as compared with prior art biochemical processes a decidedly lower quantity of sludge is obtained as excess sludge.

It has been found in several cases that it is only after the additional floculation with organic precipitating materials that small quantities of sludge can be removed from the purified water.

The Kefir microorganisms used in the method of the invention are cultured from Kefir mould with the addition of substantially defatted milk at room temperature, the milk serving as a nutrient material for the organisms. As a result the nutrient solution is decomposed and a spherical coherent culture remains. The culture is sieved out and washed with drinking water.

After the first washing operation preferably a part of the culture remaining is added to ten times as much water, then dispersed and the suspension is then centrifuged. The centrifugate is used as a material for inocculating the liquid to be cleaned, to which it is added.

It is also possible to add the culture after the first washing operation directly to the liquid to be cleaned.

It has been found in accordance with experience that in the case of the use of the centrifugate as inocculating material the inocculated water should be supplied to a drip body-like column, in which, however, departing from drip body filling material, filling bodies with a cylindrical form are used consisting of stainless antimagnetic steel fabric with a mesh width of less than 300 microns. This leads to a substantial increase in the surface in the column as compared with normal drip body material and per gram of the filling body material for the lawn of microorganisms a surface of 2 square meters is made available.

The liquid inoculated with the microorganisms is pumped several times through the column. As is the case with a drip body the entering water is passed by a rotary sprinkle onto the column.

Examples for the reduction of the chemical oxygen requirement in accordance with the dichromate method:

(1) Precleaned sewage from a toilet paper factory after electrochemical treatment with the electro-M-method, COD 40 mg/l,
  1.1 after addition of 2 ml of microorganism centrifugate per liter and 2 hours of treatment time in the drip column, COD 10 mg/l.
(2) Precleaned domestic sewage after electrochemical treatment with the electro-M-method, COD 184 mg/l,
  2.1 after addition of 5 ml of microorganism centrifugate per liter and 4 hours of treatment time in the drip column, COD 28 mg/l.
(3) Precleaned textile sewage water from dispersion dying vats after electrochemical treatment with the electro-M-method, COD 296 mg/l,
  3.1 after addition of 10 ml of microorganism centrifugate per liter and 2 hours of treatment time in the drip column, COD 194 mg/l,
  3.2 after a further 2 hours, COD 82 mg/l,
  3.3 after a further 2 hours, COD 41 mg/l.
(4) The water in accordance with 3.2 within 2 hours 50% of precleaned communal water was added, entry, COD 225 mg/l,
  4.1 after 2 hours of treatment time in the drip column, COD 62 mg/l,
  4.2 after a further 2 hours, COD 34 mg/l.
(5) The water in accordance with 4.2 within 1 hour 50% precleaned textile sewage was added, entry COD 330 mg/l,
  5.1 after 2 hours of treatmet time in the drip column, COD 194 mg/l,
  after 4 hours
  COD 152 mg/l,
  after 8 hours
  COD 48 mg/l.
  The BOD of this sample was 20 1 mg/l.
(6) Precleaned sewage from a skin glue factory after electrochemical treatment with the electro-M-method, COD 883 mg/l,
  6.1 after addition of 20 ml of microorganism centrifugate per liter and 2 hours of treatment time in the prepared driping column, COD 182 mg/l, after 6 hours of treatment time in the drip column, COD 52 mg/l.

Furthermore, the inocculation of classical biochemical activated sludge installations with the centrifugate of the Kefir microorganisms or the washed-out mould cultures show substantial improvements in the efficiency on the basis of the treatment time of the water in the biological stage.

However no substantial change in the excess sludge quantities could be detected, something which could be clearly found in the case of addition of the inocculating composition in a pure form.

Visible residual turbidity was decreased by the addition of Kefir microorganisms to the water and the odor in contrast to the discharge from known biological stages is no longer mouldy or earth-like and instead is fresh or neutral.

The microorganisms can be considered to be extraordinarily stable, as a few test examples will show:

EXAMPLE 1

The culture taken from the milk nutrient solution was stored in a Petri dish for 8 days in a sterile cupboard and then washed out and centrifuged. In the centrifugate numerous Kefir microorganisms were comprised which after the addition of nutrient solutions reproduced very rapidly.

EXAMPLE 2

The centrifugate obtained in example 1 was stored for 26 days in a bottle with a ground glass stopper with 50% ullage at a temperature of +6° C. in a refrigerator and then the centrifugate was used again for inocculating sewage. In the centrifugate the microorganisms were present in great numbers. Dead cells could not be detected.

EXAMPLE 3

A drip column inocculated with the centrifugate in accordance with example 2 had after 8 weeks of test procedure such an extensive culture that further inocculation was no longer necessary even in the case of cleaning tests with the most various different forms of sewage.

The aerobic microorganisms passing with the sewage into the column, which are used in the case of normal biochemical cleaning, were not impaired by the Kefir microorganisms.

However, it could be found in this case as well that the excess sludge quantity was substantially reduced so that it can be supposed that the main cleaning effect can be attributed to the Kefir microorganisms.

In the case of the use of the drip column it was preferred to work with a body whose height is 20 times its diameter. The overall volume was reduced by 50% by the metal filling bodies.

I claim:

1. A method for removal of contaminating impurities from sewage and waste water liquid, which comprises the steps of subjecting said liquids to an electrochemical electrocoagulation pretreatment to free the liquids of solids and colloidal-suspended matter;

adding to said pretreated liquid a seed from a Kefir milk acid bacterial microorganism culture in the form of a centrifugate of a Kefir milk bacteria culture;

passing said seeded liquid over a column consisting of an anti-magnetic stainless steel fabric in a cylindrical shape, and having a large surface area on which said Kefir seed of microorganisms deposits and forms a biological lawn;

supplying atmospheric oxygen to said column while passing said contaminated liquid thereover; said lawn of Kefir microorganisms utilizing the bacterial contaminants of said liquid as nutrient material, whereby, owing to the biological processes of said Kefir bacteria, said liquids are freed from said contaminants; and then collecting the purified effluent from said column.

2. The method in accordance with claim 1 wherein said sewage and waste water liquids are subjected to biochemical aerobic treatment before the addition of the Kefir milk acid bacteria.

3. The method in accordance with claim 1 in which the biological lawn formed by the addition of said Kefir bacteria is enriched with conventional aerobic microorganisms and in which said Kefir bacteria are continuously added to said liquid and thus become numerically superior with respect to bacteria in said liquid.

4. The method in accordance with claim 1 in which said Kefir milk acid bacteria are cultured with skimmed milk powder mixed with drinking water as a nutrient solution.

5. The method in accordance with claim 1 in which after the treatment of said liquid with Kefir milk acid bacteria, the effluent from the column is subjected to an electrochemical coagulation to remove any remaining bacteria and colloidal suspension.

6. The method, as claimed in claim 1, wherein said pretreatment comprising the steps of coagulating and flocculating said solids and colloidal suspended matter impurities in said liquid by passing an electric current through said liquid; and subsequently separating the coagulated flocculate so formed, from the liquid.

* * * * *